US012785466B2

(12) United States Patent
Chang et al.

(10) Patent No.: US 12,785,466 B2
(45) Date of Patent: Nov. 3, 2026

(54) STATOR STRUCTURE WITH FLAT WIRE WINDINGS

(71) Applicant: FUKUTA ELECTRIC & MACHINERY CO., LTD., Miaoli County (TW)

(72) Inventors: Chin Feng Chang, Miaoli County (TW); Chih Meng Chu, Miaoli County (TW); Zhi Zheng Wu, Miaoli County (TW); Chen Hui Chang, Miaoli County (TW)

(73) Assignee: FUKUTA ELECTRIC & MACHINERY CO., LTD., Miaoli County (TW)

( * ) Notice: Subject to any disclaimer, the term of this patent is extended or adjusted under 35 U.S.C. 154(b) by 161 days.

(21) Appl. No.: 18/947,331

(22) Filed: Nov. 14, 2024

(65) Prior Publication Data

US 2026/0135420 A1 May 14, 2026

(51) Int. Cl.
*H02K 1/16* (2006.01)
*H02K 3/34* (2006.01)

(52) U.S. Cl.
CPC ............. *H02K 1/165* (2013.01); *H02K 3/345* (2013.01); *H02K 2213/03* (2013.01)

(58) Field of Classification Search
CPC ........................... H02K 2213/03; H02K 3/487
USPC ........... 310/214, 216.069, 216.071, 216.072, 310/216.019, 216.106, 187, 216.129, 310/216.008, 216.009, 216.077, 216.097, 310/216.111, 216.119
See application file for complete search history.

(56) References Cited

U.S. PATENT DOCUMENTS 1,500,834 A * 7/1924 Macmillan ............. H02K 17/20 310/212
1,524,558 A * 1/1925 Kincaid ................. H02K 3/345 310/43
2,175,915 A * 10/1939 Potter .................... H02K 17/20 310/211
2,333,538 A * 11/1943 Liwschitz ............. H02K 1/265 318/734
2,370,458 A * 2/1945 Goran .................. H02K 15/023 310/211
3,027,474 A * 3/1962 Rosenberry, Jr. ...... H02K 17/20 310/212
3,488,532 A * 1/1970 Anderson ................ H02K 9/20 310/58
3,621,315 A * 11/1971 Dalmo ..................... H02K 3/24 310/183

(Continued)

*Primary Examiner* — Maged M Almawri
(74) *Attorney, Agent, or Firm* — MUNCY, GEISSLER, OLDS & LOWE, P.C.

(57) ABSTRACT

A stator structure with flat wire windings comprises a stator core, flat wire windings, and insulation sheets. The stator core includes an annular yoke and multiple teeth arranged circumferentially along the yoke, with slots extending radially between adjacent pairs of teeth, and each pair of teeth having shoes extending circumferentially from the ends thereof to form a slot opening. The flat wire winding consists of a linear conductor with an inserted section positioned within the slot. The insulation sheet is installed in the slot to encase the arranged inserted sections, and the slot contains a pair of protruding blocks that extend in a direction perpendicular to the radial direction, thereby confining the inserted section between the protruding blocks and the slot bottom.

8 Claims, 7 Drawing Sheets

(56) References Cited

U.S. PATENT DOCUMENTS 3,688,141 A * 8/1972 Maslennikov ......... H02K 17/20 310/214
3,778,652 A * 12/1973 Endress ................. H02K 17/20 310/216.069
3,832,583 A * 8/1974 Chang .................... H02K 17/20 310/201
4,462,467 A * 7/1984 Weingartner .......... B25D 16/00 173/105
5,045,742 A * 9/1991 Armstrong ............. H02K 1/146 310/216.013
5,182,483 A * 1/1993 Hibino ..................... H02K 1/32 310/211
5,804,747 A * 9/1998 Chen ...................... F16M 13/02 248/443
6,008,445 A * 12/1999 Chen ...................... G10D 13/18 84/411 R
D420,348 S * 2/2000 Chang .......................... D14/218
6,136,691 A * 10/2000 Chen ..................... H10P 70/273 438/643
6,211,067 B1 * 4/2001 Chen ..................... H10P 50/283 438/692
D447,508 S * 9/2001 Chen .............................. D17/22
6,362,552 B1 * 3/2002 Jeppesen ................ H02K 1/265 310/211
D471,078 S * 3/2003 Chen .............................. D8/349
6,752,124 B1 * 6/2004 Chang ..................... F02B 31/04 123/308
7,059,218 B1 * 6/2006 Lin ........................ B25G 1/063 81/62
7,146,855 B1 * 12/2006 Chang .................... A61B 5/224 73/379.01
D608,667 S * 1/2010 Chang ............................ D10/59
7,960,633 B1 * 6/2011 Chen ...................... G10D 13/02 84/411 R
8,344,578 B1 * 1/2013 Chang .................. H02K 15/023 310/212
8,368,192 B1 * 2/2013 Chen ..................... H10W 42/60 257/676
8,863,357 B1 * 10/2014 Chang ....................... E05F 3/12 16/56
D836,688 S * 12/2018 Chang .......................... D15/141
10,366,679 B1 * 7/2019 Chen ...................... G10D 13/11
10,518,622 B1 * 12/2019 Chang ...................... B62M 7/12
10,803,713 B1 * 10/2020 Chang .................. G02B 6/0021
D930,586 S * 9/2021 Chang .............................. D15/1
D936,105 S * 11/2021 Chang .............................. D15/1
D936,106 S * 11/2021 Chang .............................. D15/1
11,488,679 B1 * 11/2022 Kuo ................. G11C 29/12015
11,811,291 B2 * 11/2023 Estival .................. B64C 13/503
2002/0186998 A1 * 12/2002 Chen .................... F16M 13/022 403/97
2003/0039506 A1 * 2/2003 Chen ...................... F16M 11/10 403/96
2005/0072597 A1 * 4/2005 Lee ..................... G02F 1/13452 174/262
2005/0083444 A1 * 4/2005 Chen ................... G02F 1/13452 349/40
2005/0083473 A1 * 4/2005 Chen ................... G02F 1/13452 349/150
2005/0127936 A1 * 6/2005 Chen .................... G01R 27/205 324/760.01
2005/0139382 A1 * 6/2005 Chen .................... H05K 1/0271 174/254
2005/0162603 A1 * 7/2005 Cheng ................. G02F 1/13452 349/149
2005/0167853 A1 * 8/2005 Lee ..................... H10W 72/073 257/784
2005/0184389 A1 * 8/2005 Chen .................... H10D 86/441 257/784
2005/0253993 A1 * 11/2005 Chen ................... G02F 1/13452 349/152
2006/0017448 A1 * 1/2006 Chen .................. G01R 1/07378 228/104
2006/0290225 A1 * 12/2006 Mipo ....................... H02K 1/16 310/216.069
2007/0024321 A1 * 2/2007 Lin .................... H10D 30/0212 257/E21.64
2007/0052317 A1 * 3/2007 Tanaka ................... H02K 3/487 310/214
2007/0103632 A1 * 5/2007 Chen ................... G02F 1/13452 349/149
2007/0144771 A1 * 6/2007 Chen ...................... H05K 3/361 361/749
2007/0177066 A1 * 8/2007 Chen ..................... G02F 1/1309 349/40
2007/0224745 A1 * 9/2007 Chang .................. H10D 30/601 257/E21.252
2008/0018600 A1 * 1/2008 Hou ...................... G06F 3/0338 345/161
2008/0053290 A1 * 3/2008 Chen ...................... G10D 13/28 84/411 R
2008/0129136 A1 * 6/2008 Abe ..................... H02K 21/042 310/156.35
2008/0203846 A1 * 8/2008 Hoemann .............. H02K 17/16 29/598
2008/0310169 A1 * 12/2008 Chen .................... G02B 5/0278 362/311.06
2009/0000455 A1 * 1/2009 Chang .................... B23D 55/02 83/859
2009/0047879 A1 * 2/2009 Chang ....................... B24B 7/00 451/178
2009/0073122 A1 * 3/2009 Hou .................... G06F 3/03547 345/163
2009/0079289 A1 * 3/2009 Lang ...................... H02K 17/20 310/214
2009/0085421 A1 * 4/2009 Saito ........................ H02K 3/12 310/214
2009/0251021 A1 * 10/2009 Atarashi .............. H02K 1/2796 310/156.07
2010/0013769 A1 * 1/2010 Hou ...................... G06F 3/0362 345/163
2010/0019626 A1 * 1/2010 Stout ........................ H02K 1/02 310/214
2010/0026008 A1 * 2/2010 Sawahata ............... H02K 1/165 310/179
2010/0032541 A1 * 2/2010 Chen ..................... F16B 7/1472 248/527
2010/0052464 A1 * 3/2010 Yu ........................ H02K 17/168 310/216.069
2010/0141075 A1 * 6/2010 Atarashi .............. H02K 1/2796 310/156.35
2010/0232123 A1 * 9/2010 Chang .................. H05K 5/0278 361/752
2010/0232965 A1 * 9/2010 Chang ................... F03D 7/0248 416/169 R
2010/0253174 A1 * 10/2010 Yabe ...................... H02K 17/20 310/212
2011/0030529 A1 * 2/2011 Chen ...................... G10D 13/02 84/414
2011/0198962 A1 * 8/2011 Tang ........................ H02K 3/28 310/216.069
2011/0309707 A1 * 12/2011 Kato ........................ H02K 1/30 310/156.54
2012/0112592 A1 * 5/2012 Yamada ............... H02K 1/2746 310/156.53
2012/0159801 A1 * 6/2012 Chang .................... B01D 53/26 34/218
2012/0164008 A1 * 6/2012 Chang ..................... F04D 17/02 417/375
2012/0318479 A1 * 12/2012 Chang ...................... H02K 5/15 165/104.19
2012/0325423 A1 * 12/2012 Chang ................ B22D 19/0054 164/63
2013/0009294 A1 * 1/2013 Chen ................... H10W 70/411 257/676
2013/0009497 A1 * 1/2013 Chang ...................... H02K 9/14 310/64

(56) References Cited

U.S. PATENT DOCUMENTS

2013/0033144 A1* 2/2013 Alfermann ........... B23K 20/129
310/211
2013/0069223 A1* 3/2013 Chen ................ G06K 19/07724
257/737
2013/0122079 A1* 5/2013 Dizio ...................... A61L 24/06
424/449
2013/0169097 A1* 7/2013 Saban .................... H02K 21/22
310/152
2013/0169099 A1* 7/2013 Saban .................... H02K 1/278
310/156.12
2014/0028146 A1* 1/2014 Sugimoto .............. H02K 1/265
310/216.069
2014/0159534 A1* 6/2014 Taniguchi ............ H02K 1/2746
310/156.53
2014/0184009 A1* 7/2014 Taniguchi ............ H02K 1/2746
310/156.53
2014/0196967 A1* 7/2014 Chang .................... A63B 55/57
701/2
2014/0203681 A1* 7/2014 Xiang .................... H02K 1/165
310/216.001
2015/0001984 A1* 1/2015 Bradfield ............... H02K 1/165
310/216.069
2016/0101538 A1* 4/2016 Chang ....................... B27C 7/00
82/149
2016/0164387 A1* 6/2016 Komatsu .................. H02K 1/26
29/598
2016/0172918 A1* 6/2016 Hirotani ................... H02K 1/16
310/198
2016/0297094 A1* 10/2016 Chang ..................... B27B 13/14
2016/0334051 A1* 11/2016 Chang ...................... F16M 3/00
2016/0375603 A1* 12/2016 Chang ....................... B24B 7/28
144/130
2017/0040853 A1* 2/2017 Totaro .................... H02K 21/22
2017/0246757 A1* 8/2017 Chang ..................... B24B 41/02
2018/0161898 A1* 6/2018 Chen ......................... C25F 7/00
2018/0163319 A1* 6/2018 Chen ......................... C25F 7/00
2018/0212501 A1* 7/2018 Mayor ................... H02K 17/16
2018/0358868 A1* 12/2018 Chang .................. C21D 8/1244
2019/0047102 A1* 2/2019 Chang ...................... B23Q 5/20
2019/0047321 A1* 2/2019 Chang ....................... B44B 3/06
2019/0047322 A1* 2/2019 Chang ....................... B44B 1/06
2020/0047847 A1* 2/2020 Chang ...................... B62M 6/45
2020/0047848 A1* 2/2020 Chang .................... B62M 11/10
2020/0049248 A1* 2/2020 Chang ...................... B62M 6/65
2020/0119630 A1* 4/2020 Asano .................... H02K 21/44
2020/0171592 A1* 6/2020 Fan .......................... B23H 7/26
2020/0180057 A1* 6/2020 Chen ........................ B23H 3/06
2020/0212734 A1* 7/2020 Du .......................... H02K 1/165
2021/0078197 A1* 3/2021 Chang ....................... B27C 7/04
2021/0100090 A1* 4/2021 Chang .................. H05K 1/0201
2021/0242732 A1* 8/2021 Soma ..................... H02K 1/276
2022/0264740 A1* 8/2022 Chang .................. H05K 1/0227
2023/0209768 A1* 6/2023 Chang ....................... G06F 1/20
361/679.53
2023/0350600 A1* 11/2023 Chang ...................... G10K 9/12
2024/0195236 A1* 6/2024 Chang ...................... H02K 3/12
2024/0204583 A1* 6/2024 Chang ...................... H02K 3/12
2024/0211015 A1* 6/2024 Yen ....................... G06F 1/3275
2024/0261781 A1* 8/2024 Hsu ........................ G02B 21/34
2024/0363151 A1* 10/2024 Chang ...................... G11C 7/04
2025/0130968 A1* 4/2025 Chang ................... G06F 13/409
2025/0214162 A1* 7/2025 Chang .................... B23D 55/04
2025/0260274 A1* 8/2025 Chang ...................... H02K 1/20
2025/0260282 A1* 8/2025 Chang ...................... H02K 1/32
2026/0003534 A1* 1/2026 Chang ................... G06F 3/0652
2026/0004006 A1* 1/2026 Chang ..................... G06F 21/79
2026/0086004 A1* 3/2026 Hsu ...................... G01N 1/2813
2026/0098790 A1* 4/2026 Hsu .......................... G01N 1/30
2026/0135420 A1* 5/2026 Chang .................... H02K 1/165
2026/0135427 A1* 5/2026 Chang ...................... H02K 1/16

* cited by examiner

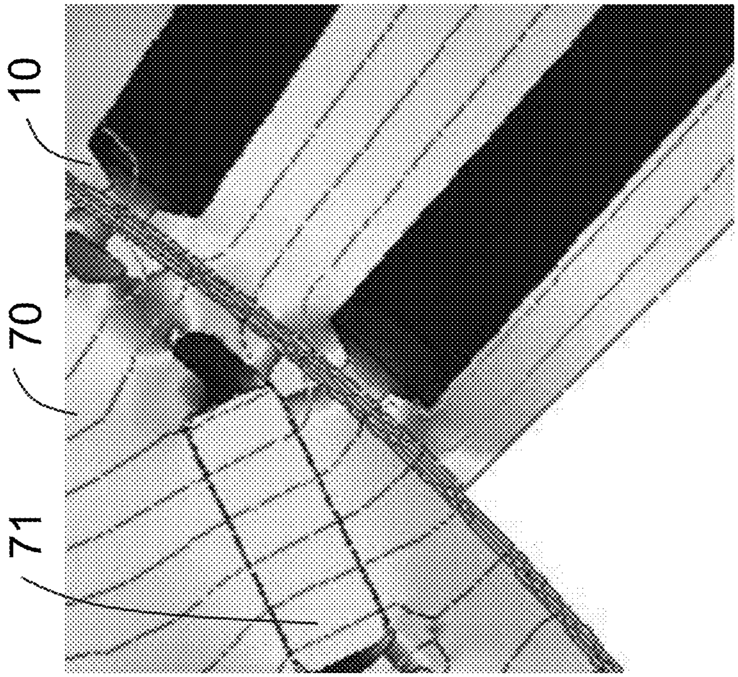
Terminal Voltage = 38.81[$V_{rms}$]
$V_{peak}$= 54.98[V]
FIG. 6A
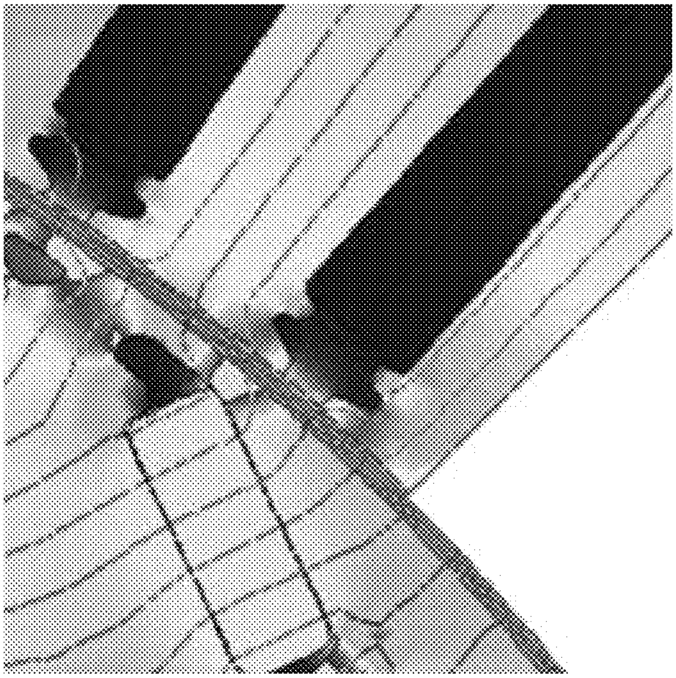
Terminal Voltage = 38.81[$V_{rms}$]
$V_{peak}$= 54.98[V]
FIG. 6B
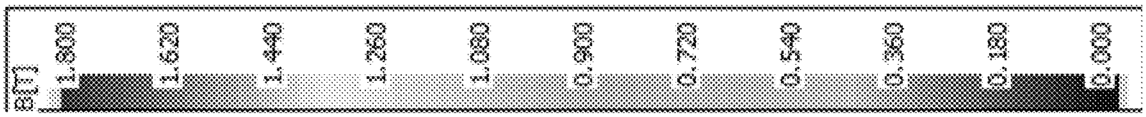

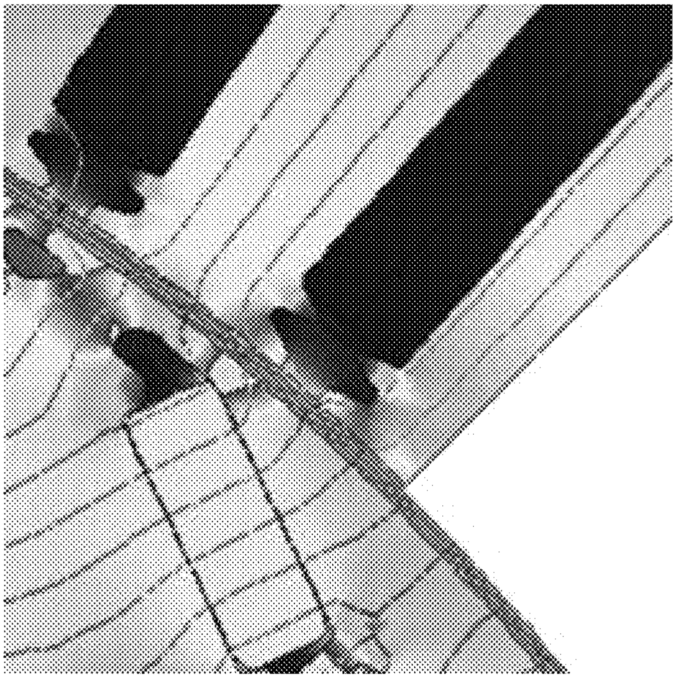
Terminal Voltage = 38.81[$V_{rms}$]
$V_{peak}$= 54.98[V]
FIG. 6C
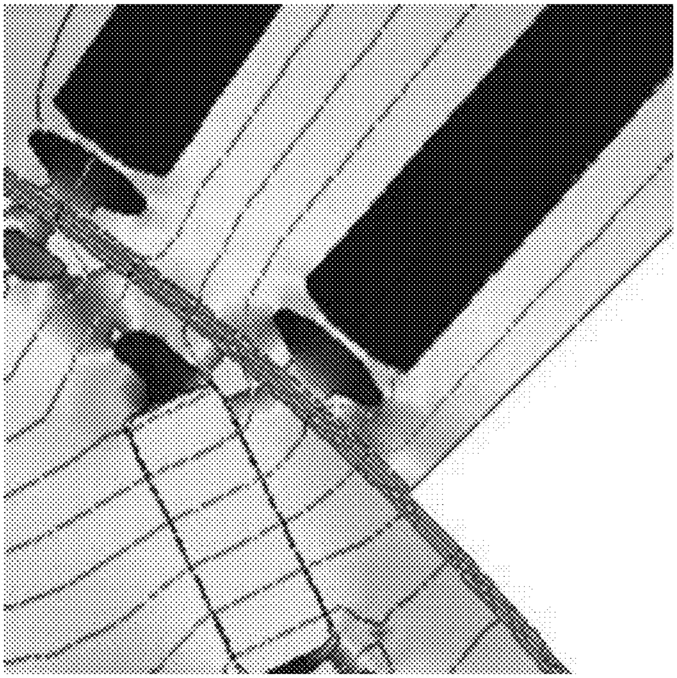
Terminal Voltage = 37.49[$V_{rms}$]
$V_{peak}$= 53.26[V]
FIG. 6D
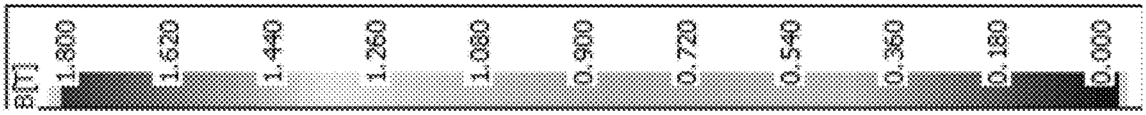

STATOR STRUCTURE WITH FLAT WIRE WINDINGS

FIELD OF INVENTION

The present disclosure relates to a stator structure, and more particularly to a stator structure using flat wire windings.

BACKGROUND OF THE INVENTION

The basic structure of a motor consists of a stator and a rotor, which convert electrical energy into rotational kinetic energy by electromagnetic induction principles to provide torque output. The interaction between the magnetic fields of the stator and the rotating element determines the output performance of the motor.

The stator core structure includes an annular yoke and multiple teeth arranged circumferentially along the yoke, with slots extending radially between adjacent pairs of teeth. The ends of each pair of teeth have shoes extending circumferentially to form a slot opening. The function of the shoes is to collect magnetic flux, the greater the circumferential extent of the shoes, the greater the magnetic flux that can be accommodated by the stator core. Consequently, the shoes that form the slot opening are typically narrow and flat in shape, making them relatively fragile in strength.

In the stator windings of three-phase induction motors, copper wires known as hairpin windings are commonly used to form the flat wire windings. Compared to the traditional windings with circular wire cross-sections, the flat wire (also called rectangular wire) windings not only increase the slot filling rate and allow higher current carrying capacity, but also provide better heat dissipation characteristics, which are beneficial for motor operation at high power density and high efficiency.

When assembling the hairpin windings, multiple flat copper wires are first sequentially bent into hairpin conductors. Then, according to the wiring layout, the multiple hairpin conductors are stacked along the radial direction of stator core and arranged in a ring shape along the circumferential direction of the stator core. The open ends of the conductors are then inserted axially into the slots of the stator core. Finally, the open ends of the hairpins are twisted, levelled, and welded processes to form the flat wire windings. After the formed hairpin conductors are inserted into the stator core, the conductors will still expand radially within the slots due to the material properties of copper combined with the geometric tolerances from the bending and twisting operations.

Furthermore, to ensure insulation within the stator core slots, after the flat wire windings are formed, varnish is injected into the slots to fill any gaps and prevent wire movement, thereby avoiding insulation deterioration from magnet wire wear. However, since varnish has the characteristic of volume expansion during curing, this can cause conductor displacement or deformation within the gaps, potentially causing the hairpin conductors near the inner diameter of the core to protrude from the slot openings. If the rotor is installed and operated under such conditions, it may contact the conductors, leading to stator damage and increased product defect rates.

SUMMARY OF THE INVENTION

The present disclosure provides a stator structure with flat wire windings comprising a stator core, flat wire windings, and insulation sheets. The stator core includes an annular yoke with multiple teeth arranged circumferentially along the yoke. Pairs of adjacent teeth are extending radially, forming slots therebetween, with shoes extending circumferentially from the ends of each pair of teeth to form a slot opening. The flat wire windings consist of multiple linear conductors with inserted sections positioned within the slots. The insulation sheet encases the inserted sections arranged in sequence, and is installed in the slot between the inserted sections and the slot surfaces.

A pair of protruding blocks is provided inside the slot, and extends in a direction perpendicular to the radial direction, with the inserted sections confined between the protruding blocks and the slot bottom.

In a direction perpendicular to the radial direction, the width of the slot is Sw, the width of the slot opening is G1, the width of the inserted section is Lw, the thickness of the insulation sheet is It, and the distance between the pair of protruding blocks is G2. These parameters satisfy the following conditions:

$$G1 \leq G2 < Lw \text{ and } It + 0.2\text{ mm} < 0.5 \times (Sw - G2) \leq It + 1\text{ mm}.$$

In this structure, the pair of protruding blocks within the slot confine the multiple linear conductors (flat copper wires) within the slot. Therefore, when the flat copper wires experience deformation from external forces, their deformation is constrained between the protruding blocks and the slot bottom, thereby enhancing manufacturing yield.

Additionally, the following condition may also be satisfied: $0.1\text{ mm} \leq It \leq 0.3\text{ mm}$.

Furthermore, the insulation sheet comprises a main section and two overlap sections extending outwardly from opposite sides of the main section. The insulation sheet is bent to allow the two overlap sections to enclose the inserted sections arranged in sequence, with the overlap sections oriented toward the slot bottom.

Moreover, each protruding block has a tip and two angled surfaces extending from opposite sides of the tip. The slot has two slot walls extending from opposite sides of the slot bottom. In cross-section, extension lines of the two angled surfaces intersect with extension lines of their adjacent slot walls to define a first point and a second point, with the second point located between the first point and the shoe. The extension line of the slot wall intersects with a boundary of the inner circumferential surface of the stator core and defines a third point.

In cross-section, the inserted section has a thickness Lt parallel to the extension line of the slot wall. The distance from the first point to the second point is L3, and the distance from the second point to the third point is L4, satisfying the following condition: $Lt \leq L3 + L4$. This configuration ensures that even if the copper wires deform within the slot, they will not protrude from the slot opening.

Furthermore, the following condition may also be satisfied: $Lt \leq L4$.

BRIEF DESCRIPTION OF THE DRAWINGS

FIGS. 6A, 6B, 6C, and 6D are magnetic field distribution diagrams of stator slots with different structures.

DETAILED DESCRIPTION OF THE PREFERRED EMBODIMENTS

Figure 1:
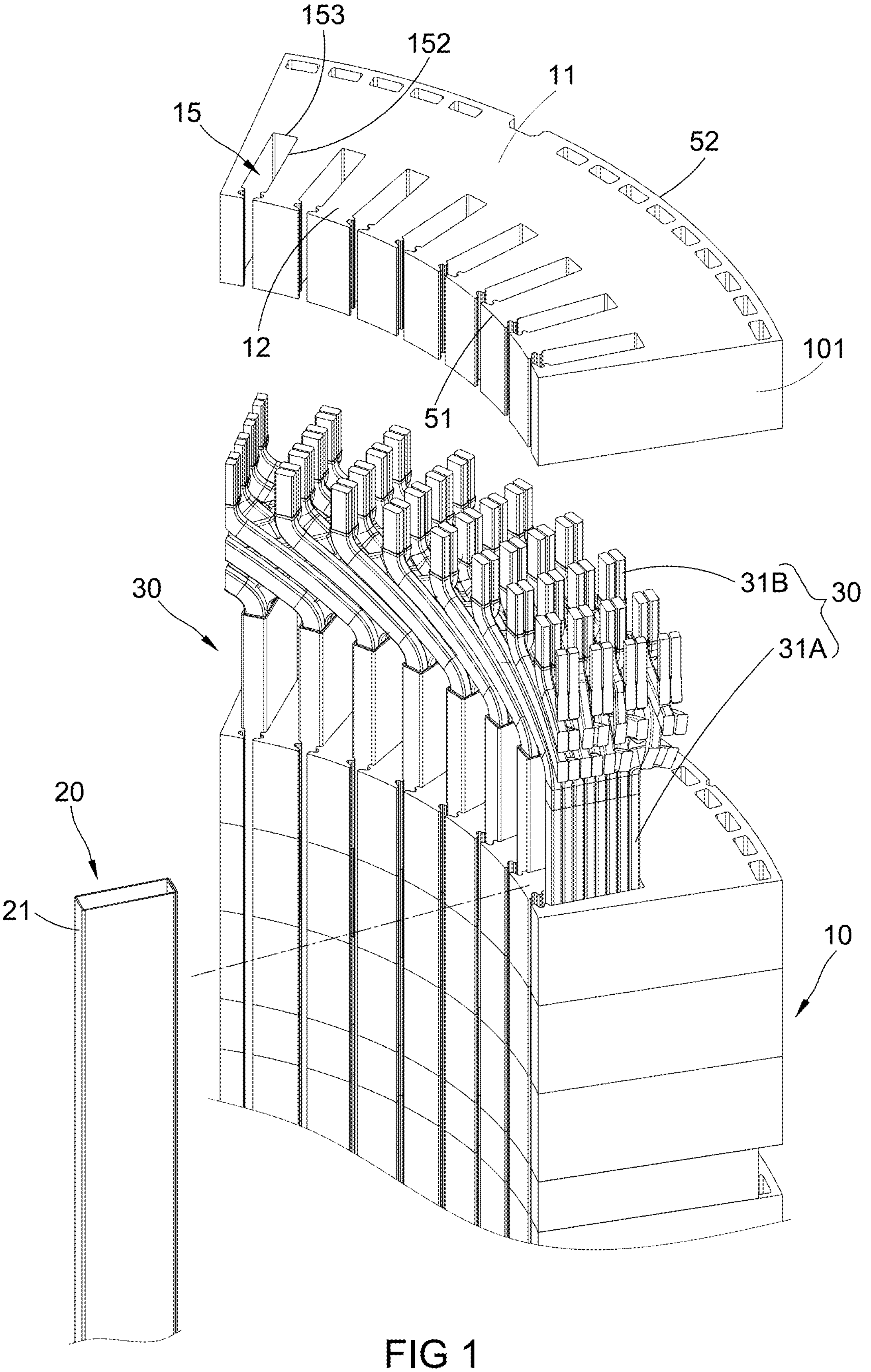
FIG. 1 is an exploded view of the components of the stator structure.
Figure 2:
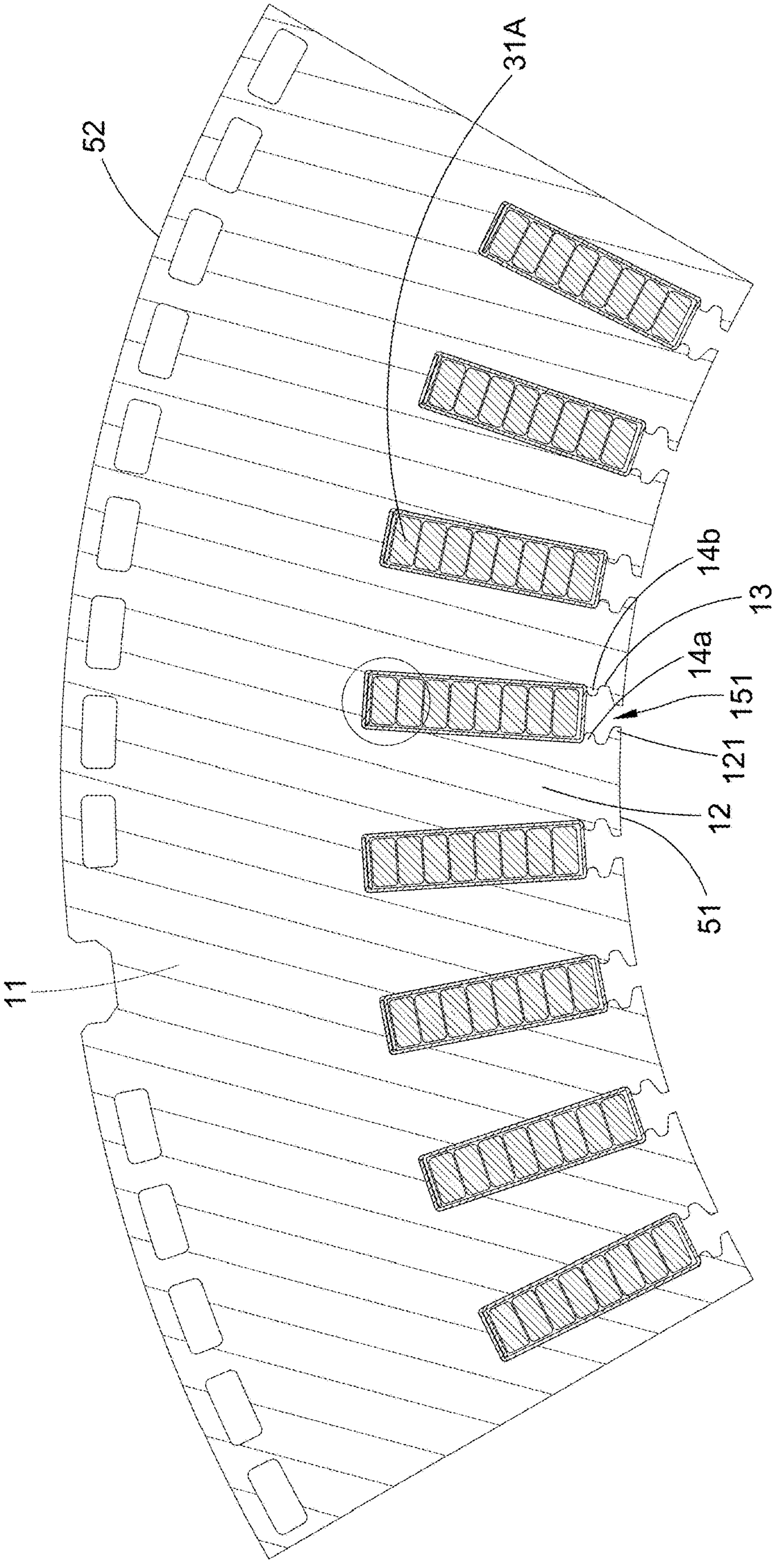
FIG. 2 is a cross-sectional view of the stator structure.

The motor structure of the present disclosure includes an inner rotor and an outer stator, wherein the stator structure is annular in its entirety. For clarity, only a portion of the stator structure is shown in this embodiment. Referring to FIGS. 1 and 2, which show a portion of the stator structure comprising a stator core 10, insulation sheets 20, and flat wire windings 30.

The stator core 10 is formed by axially stacking multiple core units 101, each of which includes an annular yoke 11 with multiple teeth 12 arranged circumferentially along the yoke 11. Slots 15 extend radially between adjacent pairs of teeth 12, with shoes 121 extending circumferentially from the ends of each pair of teeth 12. The tips 121*t* of the shoes 121 are radially symmetrical and form a slot opening 151. Each slot 15 has a slot bottom 153 near the yoke 11 and two slot walls 152 extending from opposite sides of the slot bottom 153. A portion of the surface of the shoes 121 faces the inner rotor, forming an inner circumferential surface 51 of the core unit 101, while an outer circumferential surface 52 is positioned relatively far from the teeth 12.

The flat wire windings 30 comprise multiple linear conductors 31, which may have identical or different shapes. In this description, hairpin windings are used as an example of the linear conductors 31. Each linear conductor 31 includes a bent section (not shown) and two inserted sections 31A extending from opposite ends of the bent section, with each inserted section 31A terminating in a terminal end 31B.

During installation, the linear conductors 31 are first folded into U-shapes (forming the inserted sections 31A and the bent sections), and the two inserted sections 31A are inserted along the axial direction of stator core into different slots 15. All bent sections of the linear conductors 31 are positioned at one end of the stator core 10, while the ends of the inserted sections 31A are positioned at the opposite end. The ends of all inserted sections 31A undergo twisting and leveling processes, and the wire ends of the inserted sections 31A are exposed to form the terminal ends 31B, which are welded according to the wiring layout to form complete circuits.

In this embodiment, the portion of the linear conductor 31 within the slot 15 is defined as the inserted section 31A. During installation, deformation of the inserted sections 31A due to external forces may result in increased defect rates. Additionally, even if the linear conductor 31 is not U-shaped, such as in cases of an I-pin, S-winding, or X-pin as defined in existing technology, as long as these conductors have inserted sections 31A within the slots 15, they fall within the scope of the linear conductors 31 as defined in this embodiment.

The insulation sheet 20 is installed in the slot 15 between the inserted sections 31A and the inner surface of the slot 15 (i.e. the slot walls 152 and the slot bottom 153). The insulation sheet 20 is configured to encase the multiple inserted sections 31A arranged in the slot 15, ensuring electrical insulation between the linear conductors 31 and the slot 15.

Figure 4:
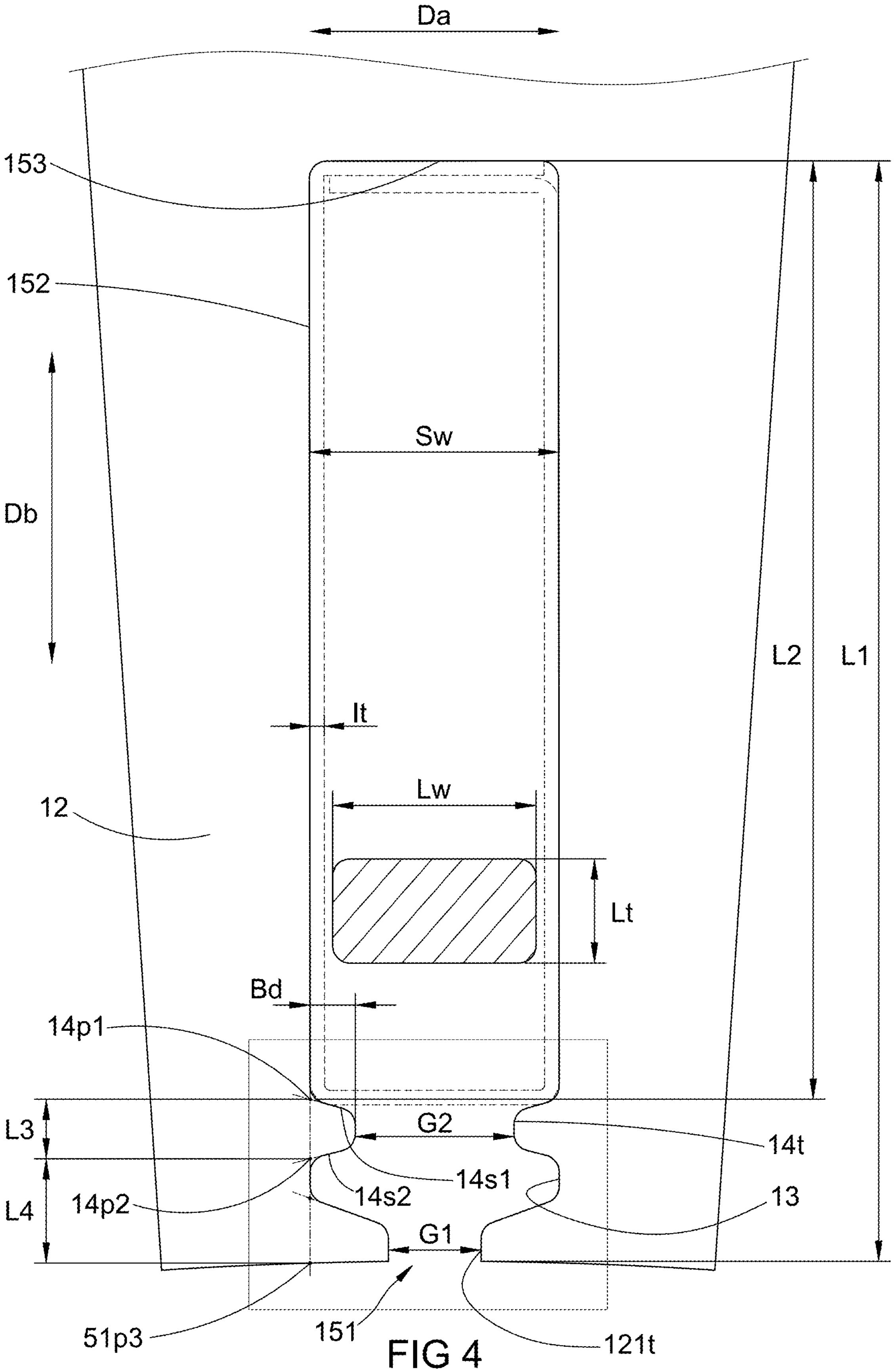
FIG. 4 is a schematic structure diagram of the stator slot.
Figure 5:
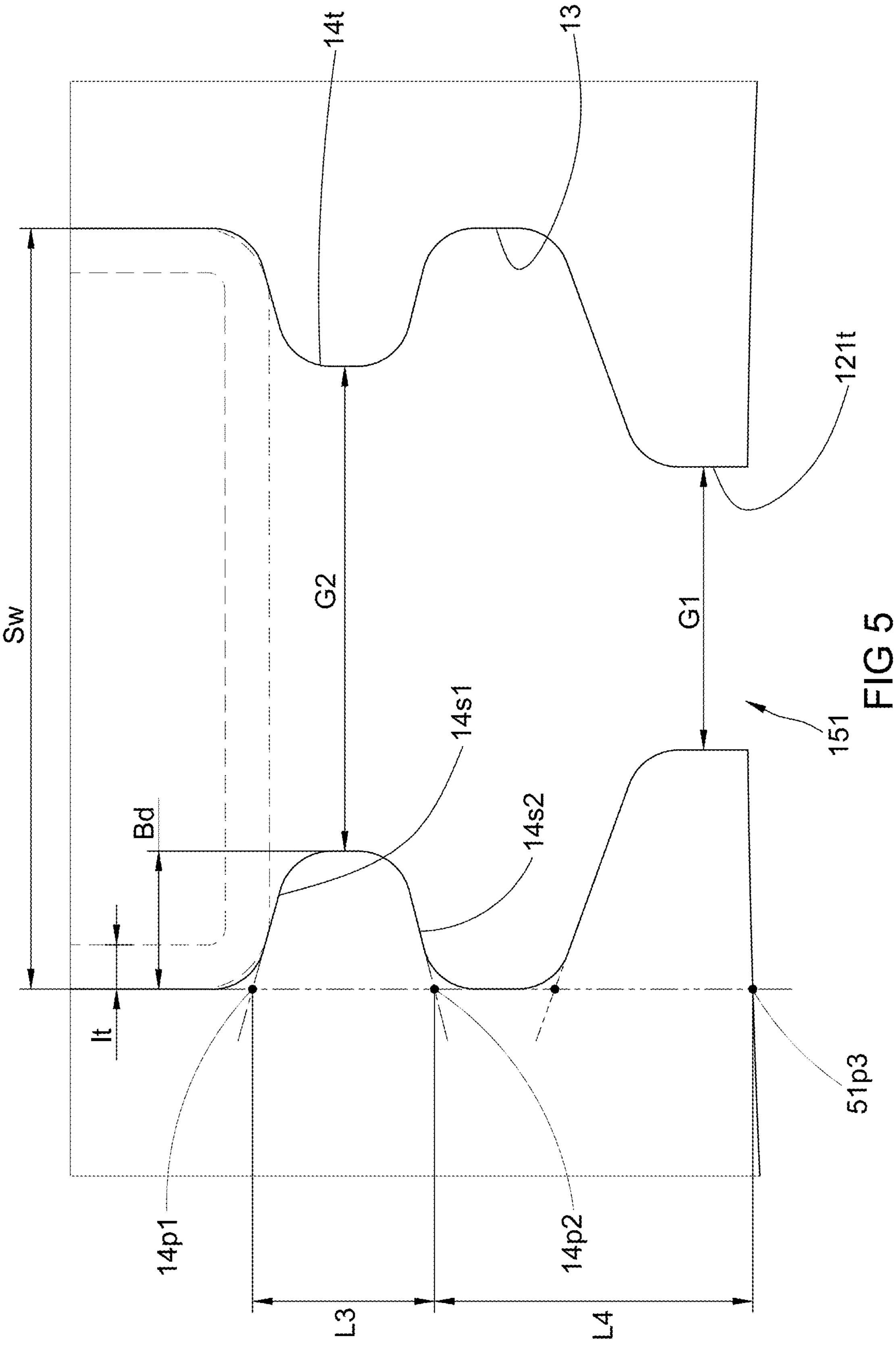
FIG. 5 is a partially enlarged view of FIG. 2.

Referring to FIGS. 2, 4, and 5, which show the cross-sectional profile of the slot 15 perpendicular to the axial direction of the stator core 10. A pair of protruding blocks 14*a* and 14*b* extend from the inner surface of the slot 15, with their protruding direction perpendicular to the slot extension direction Db. When the flat wire windings 30 are installed, the inserted sections 31A are confined between the protruding blocks 14*a*, 14*b* and the slot bottom 153.

The width direction Da of the slot 15 is perpendicular to the radial direction of the stator core 10. In the width direction Da, the width of the slot 15 is Sw, the width of the slot 15 opening is G1, the width of the inserted section 31A is Lw, the thickness of the insulation sheet 20 is It, and the distance between the pair of protruding blocks 14*a*, 14*b* is G2. These parameters satisfy the following conditions:

$$G1 \leq G2 < Lw, \text{ and}$$

$$It + 0.2\text{ mm} < 0.5 \times (Sw - G2) \leq It + 1\text{ mm}.$$

Here, 0.5×(Sw−G2) represents the protrusion distance Bd of one protruding block 14*a* (or 14*b*) toward the interior of the slot 15 relative to the slot wall 152, with the protruding blocks 14*a* and 14*b* symmetrically arranged on opposite side of the slot walls 152. Under these conditions, the protrusion distance Bd of the protruding block 14*a* toward the interior of the slot 15 is approximately 0.3 to 1 times the protrusion distance of the shoe 121 toward the slot 15.

The pair of protruding blocks 14*a* and 14*b* confines the multiple linear conductors within the slot, and when the inserted sections 31A deform under external forces, their deformation is constrained between the protruding blocks and the slot bottom. Even during the curing of the varnish in the varnish filling area 60 within the slot 15, excessive deformation is still prevented, thereby enhancing the manufacturing yield.

Furthermore, the following condition may also be satisfied: 0.1 mm≤It≤0.3 mm.

Additionally, the following condition may further be satisfied: It+0.2 mm<Bd≤It+0.6 mm. Under this condition, the protrusion distance Bd of the protruding block 14*a* toward the interior of the slot 15 is approximately 0.4 to 0.6 times the protrusion distance of the shoe 121 toward the slot 15.

In this embodiment, the width Sw of the slot 15 satisfies: 3 mm≤Sw≤5 mm. The width Lw of the inserted section 31A satisfies: 2.5 mm≤Lw≤4.5 mm.

Considering the stamping process of the stator core 10, in the cross-section shown in FIG. 4, the protruding block 14*a* has a tip 14*t* and two angled surfaces 14*s*1 and 14*s*2 extending from opposite sides of the tip 14*t*. The tips of the two protruding blocks 14*a* and 14*b* are aligned with each other, and the distance between them is defined as the width G2.

In this embodiment, the centerline of the slot 15 aligns with the radial direction of the stator core 10, thereby defining a slot extension direction Db. In cross-section, the slot walls 152 are parallel to the slot extension direction Db. The extension line of each angled surface 14*s*1 (or 14*s*2) of each protruding block 14*a* (or 14*b*) intersect with the extension line of the adjacent slot wall 152, defining a first point 14*p*1 and a second point 14*p*2. The second point 14*p*2 is positioned between the first point 14*p*1 and shoe 121. The intersection of the slot wall 152 extension line with the boundary of the inner circumferential surface 51 of the stator core 10 is defined as a third point 51*p*3.

In this cross-section, the inserted section 31A has a thickness, Lt, oriented parallel to the slot extension direction Db. The distance from the slot bottom 153 to the third point 51*p*3 is defined as L1; the distance from the slot bottom 153 to the first point 14*p*1 as L2; the distance from the first point 14*p*1 to the second point 14*p*2 as L3; and the distance from the second point **14*p*2 to the third point 51*p*3** as L4. These distances meet the following relationship:

$$L1=L2+L3+L4.$$

For purposes of this embodiment, it is recommended that the following condition be satisfied:

$$Lt \leq L3+L4.$$

This means that the protruding blocks **14*a* and 14*b* confine the inserted sections 31A within the slot 15 at a distance of one inserted section 31A thickness Lt from the slot opening 151. Thus, even if the copper wires deform within the slot 15, they will not protrude from the slot opening 151**.

Furthermore, the following condition may also be satisfied: Lt≤L4.

In this embodiment, the thickness Lt of the inserted section 31A satisfies: 1.5 mm≤Lt≤3 mm.

In this embodiment, the junction between the shoe 121 and the protruding block **14*a* (or 14*b*) forms a flat section 13 that, in cross-section, aligns with the extension line of the slot wall 152**.

Figure 3:
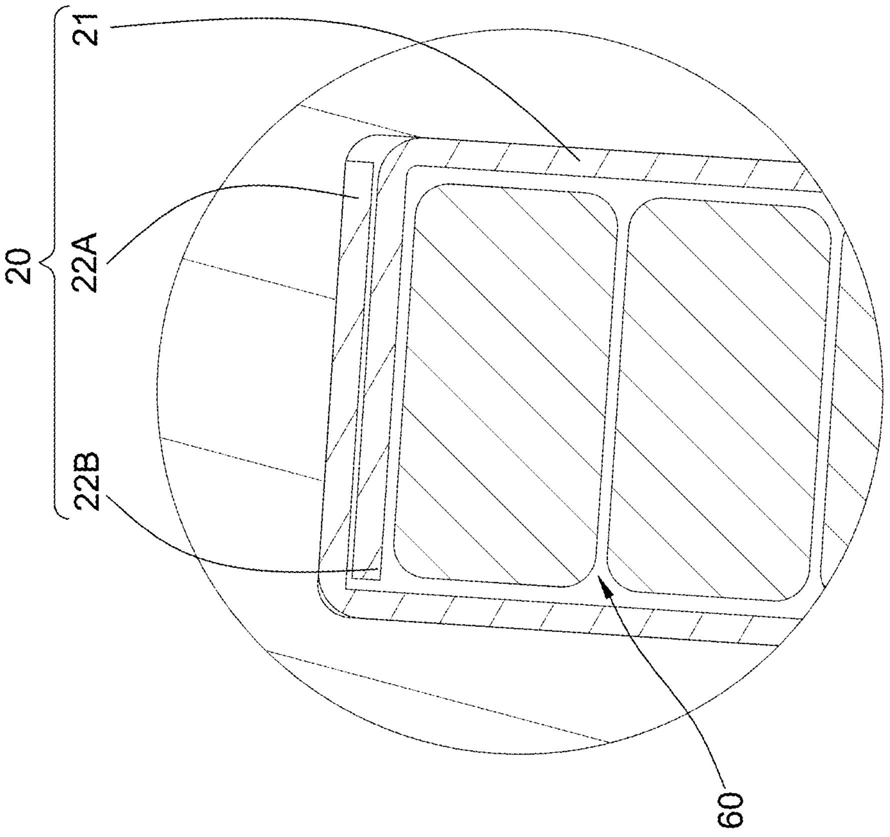
FIG. 3 is a partially enlarged view of FIG. 2.

Referring to FIGS. 2 and 3, the insulation sheet 20 in this embodiment consists of a main section 21 and two overlap sections 22A and 22B extending outwardly from opposite sides of the main section 21. When the insulation sheet 20 is placed in the slot 15, it is bent to allow the overlap sections 22A and 22B to enclose the inserted sections 31A arranged in sequence. In this embodiment, the overlap sections 22A and 22B are oriented toward the slot bottom 153, enclosing the inserted sections 31A near the outer circumferential surface 52, while a bending portion of the main section 21 is positioned between the protruding blocks **14*a* and 14*b*, enclosing the inserted sections 31A near the inner bore surface 51**.

During the stator assembly, the overlap sections 22A and 22B of the insulation sheet 20 overlap without bonding. When facing an open space in the slot 15, these overlap sections 22A and 22B may be pushed by the inserted sections 31A encased by the insulation sheet 20 or may expand due to varnish curing. Positioning the overlap sections 22A and 22B toward the slot bottom 153, with the main section 21 of the insulation sheet 20 positioned between the inserted sections 31A and the protruding blocks **14*a* and 14*b*, can prevent these issues. At the same time, this installation method of the insulation sheet 20 and its arrangement with the protruding blocks 14*a* and 14*b* also helps to control the deformation of the inserted sections 31**A.

In a specific embodiment, the slot 15 accommodates eight inserted sections 31A, with G1=1.6 mm, G2=2.74 mm, Lw=3.51 mm, Sw=4.3 mm, It=0.25 mm, Bd=0.78 mm, Lt=1.8 mm, L2=16.27 mm, L3=0.91 mm, and L4=1.85 mm.

In another specific embodiment, the slot 15 accommodates six inserted sections 31A, with G1=1.6 mm, G2=3.1 mm, Lw=3.43 mm, Sw=4.5 mm, It=0.2 mm, Bd=0.7 mm, Lt=2.38 mm, L2=16.78 mm, L3=0.92 mm, and L4=1.8 mm.

Referring to FIGS. 6A, 6B, 6C, and 6D, these figures simulate the magnetic field distribution during the operation of the stator and rotor 70, with the stator core 10 representing the position of the stator. FIG. 6A shows the stator core 10 without the protruding blocks. FIG. 6B shows the stator core 10 with the protruding blocks, where the protrusion distance toward the interior of the slot 15 is approximately 0.5 times the protrusion distance of the shoes toward the slot. FIG. 6C shows the stator core 10 with the protruding blocks, where the protrusion distance of the protruding blocks toward the interior of the slot 15 is approximately 1 times the protrusion distance of the shoes toward the slot. In FIG. 6C, the tips of the two protruding blocks are connected, i.e. G2=0.

As discussed above, this embodiment demonstrates that the inclusion of the protruding blocks in the stator core 10, within the specified ranges, does not affect the operation of the motor structure and can enhance manufacturing yield.

What is claimed is:

1. A stator structure with flat wire windings, comprising:

a stator core including an yoke in an annular form and multiple teeth arranged circumferentially along the yoke, with slots extending radially between adjacent pairs of teeth, each pair of teeth having shoes extending circumferentially from the ends thereof to form a slot opening;

flat wire windings comprising multiple linear conductors with inserted sections positioned within the slots; and insulation sheets encasing the inserted sections arranged in sequence, and being installed in the slots between the inserted sections and surfaces of the slots;

wherein, a pair of protruding blocks is provided inside each of the slots, extending in a direction perpendicular to the radial direction, with the inserted sections confined between the pair of protruding blocks and a slot bottom of each of the slots;

wherein, in the direction perpendicular to the radial direction, a width of the slot is Sw, a width of the slot opening is G1, a width of the inserted section is Lw, a thickness of the insulation sheet is It, and a distance between the pair of protruding blocks is G2, satisfying the following conditions:

$$G1 \leq G2 < Lw, \text{ and}$$

$$It+0.2 \text{ mm} < 0.5\times(Sw-G2) \leq It+1 \text{ mm}.$$

2. The stator structure with flat wire windings according to claim 1, wherein the following condition is satisfied: 0.1 mm≤It≤0.3 mm.

3. The stator structure with flat wire windings according to claim 1, wherein the following condition is satisfied: It+0.2 mm<0.5×(Sw−G2)≤It+0.6 mm.

4. The stator structure with flat wire windings according to claim 1, wherein a junction between each of the shoes and each of the protruding blocks forms a flat section.

5. The stator structure with flat wire windings according to claim 1, wherein each of the insulation sheets comprises a main section and two overlap sections extending outwardly from opposite sides of the main section, with each of the insulation sheets bent such that the two overlap sections enclose the inserted sections arranged in sequence and are oriented toward the slot bottom.

6. The stator structure with flat wire windings according to claim 1, wherein varnish is filled between the insulation sheets and the inserted sections.

7. The stator structure with flat wire windings according to claim 1, wherein each of the protruding blocks has a tip and two angled surfaces extending from opposite sides of the tip, and each of the slots has two slot walls extending from opposite sides of the slot bottom;

wherein, in a cross-section, extension lines of the two angled surfaces intersect with extension lines of their adjacent slot walls to define a first point and a second point, with the second point positioned between the first point and each of the shoes, and the extension line of each of the slot walls intersect with a boundary of an inner circumferential surface of the stator core and defines a third point, and wherein, in the cross-section, each of the inserted sections has a thickness Lt parallel to the extension line of each of slot walls, the distance from the first point to the second point is L3, and the distance from the second point to the third point is L4, satisfying the condition:

$$Lt \leq L3 + L4.$$

8. The stator structure with flat wire windings according to claim 7, wherein the following condition is satisfied: $Lt \leq L4$.

* * * * *